United States Patent
Kamath et al.

(10) Patent No.: US 6,938,049 B2
(45) Date of Patent: Aug. 30, 2005

(54) CREATING ENSEMBLES OF DECISION TREES THROUGH SAMPLING

(75) Inventors: Chandrika Kamath, Tracy, CA (US); Erick Cantu-Paz, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 437 days.

(21) Appl. No.: 10/167,892

(22) Filed: Jun. 11, 2002

(65) Prior Publication Data

US 2003/0229630 A1 Dec. 11, 2003

(51) Int. Cl.$^7$ .............................................. G06F 17/30
(52) U.S. Cl. ........................... 707/102; 706/14; 705/7
(58) Field of Search ...................... 707/102, 6; 706/14; 705/7

(56) References Cited

U.S. PATENT DOCUMENTS

| | | | | |
|---|---|---|---|---|
| 5,444,796 A | * | 8/1995 | Ornstein .................. 382/157 |
| 5,787,274 A | | 7/1998 | Agrawal et al. ............ 707/102 |
| 5,787,425 A | | 7/1998 | Bigus ........................... 707/6 |
| 5,799,311 A | | 8/1998 | Agrawal et al. ............ 707/102 |
| 6,055,539 A | | 4/2000 | Singh et al. ................ 707/102 |
| 6,182,058 B1 | | 1/2001 | Kohavi ........................ 706/45 |
| 6,320,848 B1 | * | 11/2001 | Edwards et al. ............. 370/255 |
| 6,442,561 B1 | * | 8/2002 | Gehrke et al. .............. 707/102 |
| 6,750,864 B1 | | 6/2004 | Anwar ........................ 345/440 |
| 2003/0061213 A1 | | 3/2003 | Yu et al. ......................... 707/7 |
| 2003/0061228 A1 | | 3/2003 | Kamath et al. ............. 707/102 |
| 2003/0065535 A1 | | 4/2003 | Karlov et al. ................. 705/2 |
| 2003/0176931 A1 | | 9/2003 | Pednault et al. ............. 700/31 |

OTHER PUBLICATIONS

Wang et al, CMP: A Fast Decision Tree Classifier Using Multivariate Predictions, PROC 16th Intl Conf on Data Engineering, San Diego, CA, Feb. 29 Mar. 3 2000, pp. 449–60.

* cited by examiner

*Primary Examiner*—Wayne Amsbury
(74) *Attorney, Agent, or Firm*—Eddie E. Scott; Alan H. Thompson

(57) ABSTRACT

A system for decision tree ensembles that includes a module to read the data, a module to sort the data, a module to evaluate a potential split of the data according to some criterion using a random sample of the data, a module to split the data, and a module to combine multiple decision trees in ensembles. The decision tree method is based on statistical sampling techniques and includes the steps of reading the data; sorting the data; evaluating a potential split according to some criterion using a random sample of the data, splitting the data, and combining multiple decision trees in ensembles.

48 Claims, 4 Drawing Sheets

IL 10878

300

CREATING ENSEMBLES OF DECISION TREES THROUGH SAMPLING

CROSS REFERENCE TO RELATED APPLICATIONS

Related subject matter is disclosed and claimed in the following commonly owned, copending, U.S. Patent Applications; "PARALLEL OBJECT-ORIENTED DECISION TREE SYSTEM," by Chandrika Kamath and Erick Cantu-Paz, U.S. patent application Ser. No. 09/977,570, filed Jun. 8, 2001 and "CREATING ENSEMBLES OF OBLIQUE DECISION TREES WITH EVOLUTIONARY ALGO-RITHMS AND SAMPLING," by Erick Cantu-Paz and Chandrika Kamath, U.S. Ser. No. 10/133,992 filed Apr. 25, 2002. The commonly owned, copending, U.S. Patent Applications identified above are incorporated herein by reference in their entirety.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to classification systems and more particularly to decision trees.

2. State of Technology

U.S. Pat. No. 5,787,425 for an object-oriented data mining framework mechanism by Joseph Phillip Bigus, patented Jul. 28, 1998 provides the following description, "The development of the EDVAC computer system of 1948 is often cited as the beginning of the computer era. Since that time, computer systems have evolved into extremely sophisticated devices, capable of storing and processing vast amounts of data. As the amount of data stored on computer systems has increased, the ability to interpret and understand the information implicit in that data has diminished. In the past, data was stored in flat files, then hierarchical and network data base systems, and now in relational or object oriented databases. The primary method for analyzing that data has been to form well structured queries, for example using SQL (Structured Query Language), and then to perform simple aggregations or hypothesis testing against that data. Recently, a new technique called data mining has been developed, which allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information. Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground."

The paper "Creating Ensembles of Decision Trees through Sampling," by Chandrika Kamath and Erick Cantu-Paz, presented at the 33-rd Symposium on the Interface: Computing Science and Statistics, Costa Mesa, Jun. 13–16, 2001, indicates that decision trees ensembles are popular classification methods, and there are numerous algorithms to introduce randomization in a tree classifier using a given set of data. The randomization makes each tree in the ensemble different, and their results can be combined using voting to create more accurate classifiers. Sampling is one way of introducing randomization in the classifier. The traditional methods of creating ensembles of decision trees, such as bagging and boosting, do the sampling at the beginning of the creation of the tree. Thus, each tree in the ensemble is created using a slightly different input data. In the present invention, the randomization is done at each node of the tree by using a sample of the instances at the node to make the decision at the node. The resulting ensemble is competitive in accuracy and can be superior in computational cost to boosting and bagging. The paper "Creating Ensembles of Decision Trees through Sampling," by Chandrika Kamath and Erick Cantu-Paz, presented at the 33-rd Symposium on the Interface: Computing Science and Statistics, Costa Mesa, Jun. 13–16, 2001, is incorporated herein by this reference.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a decision tree system including a module to read the data, a module to sort the data, a module to evaluate a potential split of the data according to some criterion using a random sample of the data, a module to split the data, and a module to combine multiple decision trees in ensembles. One embodiment of the decision tree system includes a file and a main memory and the module to read the data, reads the data from the file to the main memory. In one embodiment, the module to read the data creates multiple decision trees. In one embodiment, the module to evaluate a potential split of the data according to some criterion using a random sample of the data, uses a different sample for each attribute. In one embodiment, the sample is a fixed number of instances. In another embodiment, the sample is a percentage of the instances. In one embodiment, the criterion used to evaluate the split is the Gini criterion. In another embodiment, the criterion used to evaluate the split is the information gain criterion.

The decision tree method of the present invention is based on statistical sampling techniques and includes the steps of reading the data; sorting the data; evaluating a potential split according to some criterion using a random sample of the data, splitting the data, and combining multiple decision trees in ensembles. The decision tree method includes a file and a main memory and the step of reading the data reads the data from the file to the main memory. The step of evaluating a potential split according to some criterion, using a random sample of the data uses a different sample for each attribute. In another embodiment, the same sample is used for all attributes. In one embodiment, the sample is a fixed number of instances at a node. In another embodiment, the sample is a percentage of the instances.

This algorithm, and its variants, can be applied wherever classification algorithms such as decision trees are used in data mining. The algorithm, and its software implementation, can be used in many commercial areas, wherever there is need to improve the accuracy of classification with little added overhead. The data being analyzed using the classification algorithms can be either scientific or commercial. For example an insurance company can use it to decide if a person is a good risk, an astronomer can use it to classify an object as a star or galaxy, and a telephone company can use it to decide if a person is likely to change to a different vendor. It can also be used for targeting marketing, identifying bad widgets in an assembly line during quality control, and in various medical applications such as identification of cancerous cells in a mammogram, or identifying the best treatment for a patient.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
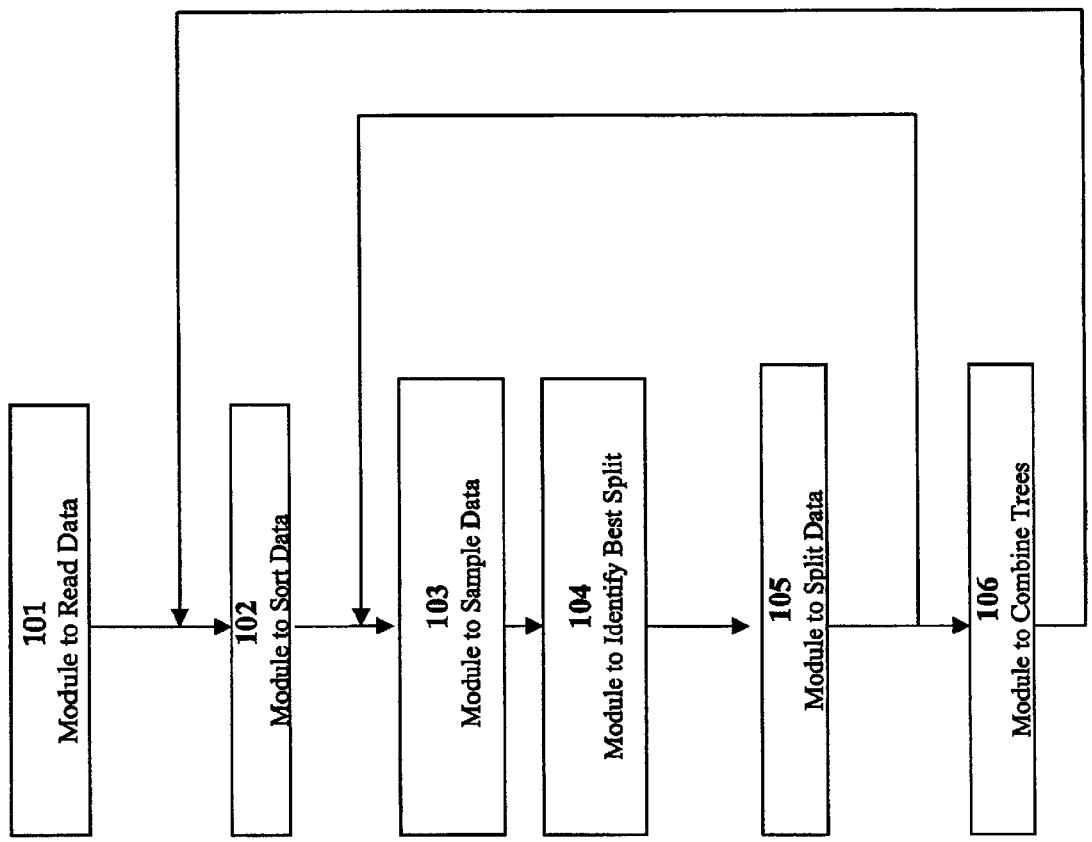
FIG. 1 is a flow chart illustrating modules included in one embodiment of a system incorporating the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Decision trees are popular classification methods, and there are numerous algorithms to induce a decision tree classifier from a data set. Most tree inducing algorithms create tests at each node that involve a single attribute of the data. These tests are obtained by finding the best split for an attribute, across all attributes, using the instances of the data at each node of the decision tree. Once the test is obtained for a node, the instances are split according to the test, and the process repeated on each of the unresolved nodes.

Recent research has shown that it is possible to improve the accuracy of classifiers, such as decision trees, by creating more than one classifier and combing their results through a voting scheme. There are several ways in which these ensembles of decision trees can be created and their results combined. The present invention provides a new way of generating ensembles using decision tree classifiers. The present invention uses a random sample of the instances at each node of the tree to make the decision at that node. Since the sample used at each node, each time a tree is created, is likely to be different, this approach allows us to create decision trees that are different. The results of these trees can be combined using a voting scheme. The present invention can result in improved accuracy with relatively little overhead in building the ensemble of trees. In fact, the time for an ensemble created using this approach may be less than the time for the creation of a single tree without sampling. In addition, the algorithm of the present invention also lends itself to parallelism.

The present invention provides a new way of creating ensembles of decision trees by sampling the data at each node of the tree. Previous approaches to creating ensembles using sampling have done the sampling before the creation of each decision tree in the ensemble. In some approaches (e.g., bagging) all trees in the ensemble are created at the same time in parallel. In other approaches (e.g., boosting, which is considered more effective than bagging) the trees are created sequentially. In both cases, the samples used to create each tree in the ensemble will be different. As a result, the most time consuming step of sorting the initial samples has to be repeated for each tree in the ensemble. Therefore, creating an ensemble of N trees with current techniques would require N times longer than creating a single tree.

In the present invention, the same initial sample is used to create each tree in the ensemble. What changes with each tree is the set of samples used to create the decision at a node. This means that the initial sorting that is required in the creation of each tree is done only once for all trees in the ensemble (as the same sample is used). Therefore, the total time to create N trees is less than N times the time to create a single tree. By efficiently sampling the data at each node, this time can be reduced to less than the time for creating a single tree. Applicants' experiments with standard datasets indicate that the performance is independent of the sampling percentage. The benefits of Applicants' approach include:

1) A parallel algorithm that can be competitive with other ensemble classifiers such as boosting on some datasets.
2) An algorithm that takes much less time than other algorithms for creating ensembles.
3) An algorithm that in some cases can take less time than creating a single tree without sampling.
4) An algorithm that can create more accurate trees through the use of ensembles.

Referring now to the drawings and in particular to FIG. 1, a flow chart is provided that illustrates one embodiment a system incorporating the present invention. The system is designated generally by the reference numeral 100. The system 100 provides a new way of generating ensembles using decision tree classifiers. The system 100 uses a random sample of the instances at each node of the tree to make the decision at that node. Since the sample used at each node, each time a tree is created, is likely to be different, this approach allows us to create decision trees that are different.

The results of these trees can be combined using a voting scheme. Use of the system 100 can result in improved accuracy with relatively little overhead in building the ensemble of trees. In fact, the time for an ensemble created using this approach may be less than the time for the creation of a single tree without sampling. In addition, the algorithm used in system 100 also lends itself to parallelism. The system 100 provides a new way of creating ensembles of decision trees by sampling the data at each node of the tree.

The following modules are included in flow chart: module to read data 101, module to sort the data 102, module to sample data 103, module to identify the best split 104, module to split the data 105, and module to combine multiple decision trees 106. It is to be understood that not all of the modules are used in individual embodiments of the invention. The embodiment 100 can be implemented on parallel computers.

The first module 101 reads the data from a file to main memory. Once the data is read into memory, it is used to create several decision trees. For each tree, the data is first sorted in the module 102. This sorting can be done separately for each tree. However, since the same instances are used to create all the trees in the ensemble, the invention also allows the sorting to be done only once for all the trees. Then, for each node of the decision tree, the data at the node is sampled in module 103. There are several different ways in which the data can be sampled—a different sample can be selected for each attribute, or the same sample can be used for all attributes; the amount to be sampled can be specified as a fixed number or a percentage of the instances; the same sampling amount can be used for all nodes or the amount could vary; different techniques can be used to obtain the samples, etc. Once the data at a node has been sampled, the best split is identified in accordance with some splitting criterion in module 104 which identifies the best split. The data is then split in module 105. The modules of sampling the data at a node, finding the best split at a node, and splitting the data at a node is repeated for each unresolved node in the decision tree. The resulting decision trees are grouped by module 106 that combines multiple decision trees to create an ensemble.

Figure 2:
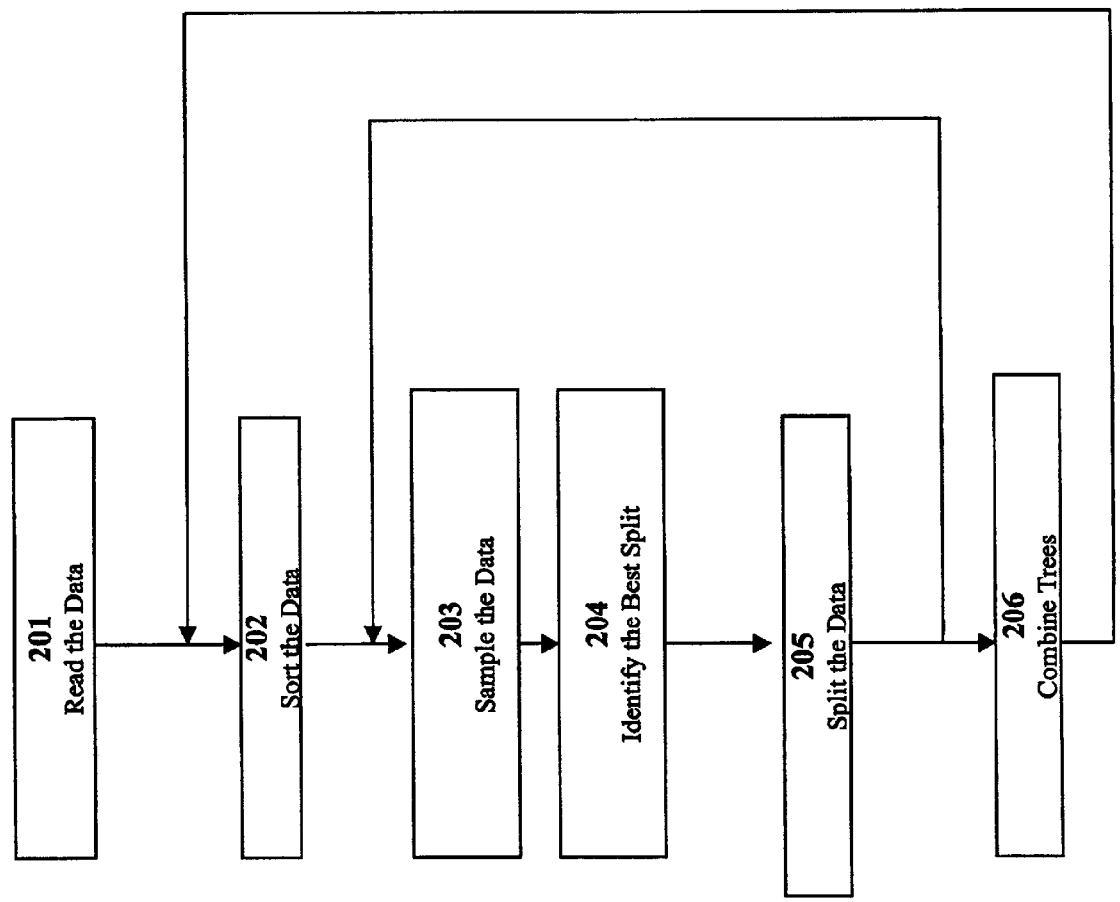
FIG. 2 is a flow chart illustrating the steps used in one embodiment of a system incorporating the present invention.

Referring now to FIG. 2, a flow chart is provided illustrating the steps used in one embodiment of a system incorporating the present invention. The system is designated generally by the reference numeral 200. The following steps are included in flow chart: step to read data 201, step to sort the data 202, step to sample data 203, step to identify the best split 204, step to split the data 205, and step to combine multiple decision trees 206. It is to be understood that not all of the steps are used in individual embodiments of the invention. The embodiment 200 can be implemented on parallel computers.

The first step 201 reads the data from a file to main memory. Once the data is read into memory, it is used to create several decision trees. For each tree, the data is first sorted in step 202. This sorting can be done for each tree. However, the invention also allows the sorting to be done only once for all the trees. Then, for each node of the decision tree, the data at the node is sampled in step 203. There are several different ways in which the data can be sampled—a different sample can be selected for each attribute, or the same sample can be used for all attributes; the amount to be sampled can be specified as a fixed number or a percentage of the instances; the same sampling amount can be used for all nodes or the amount could vary; different techniques can be used to obtain the samples, etc. Once the data at a node has been sampled, the best split is identified in accordance with some splitting criterion in step 204 which identifies the best split. The data is then split in step 205. The steps of sampling the data at a node, finding the best split at a node, and splitting the data at a node is repeated for each unresolved node in the decision tree. The resulting decision trees are grouped by step 206 that combines multiple decision trees to create an ensemble.

Figure 3:
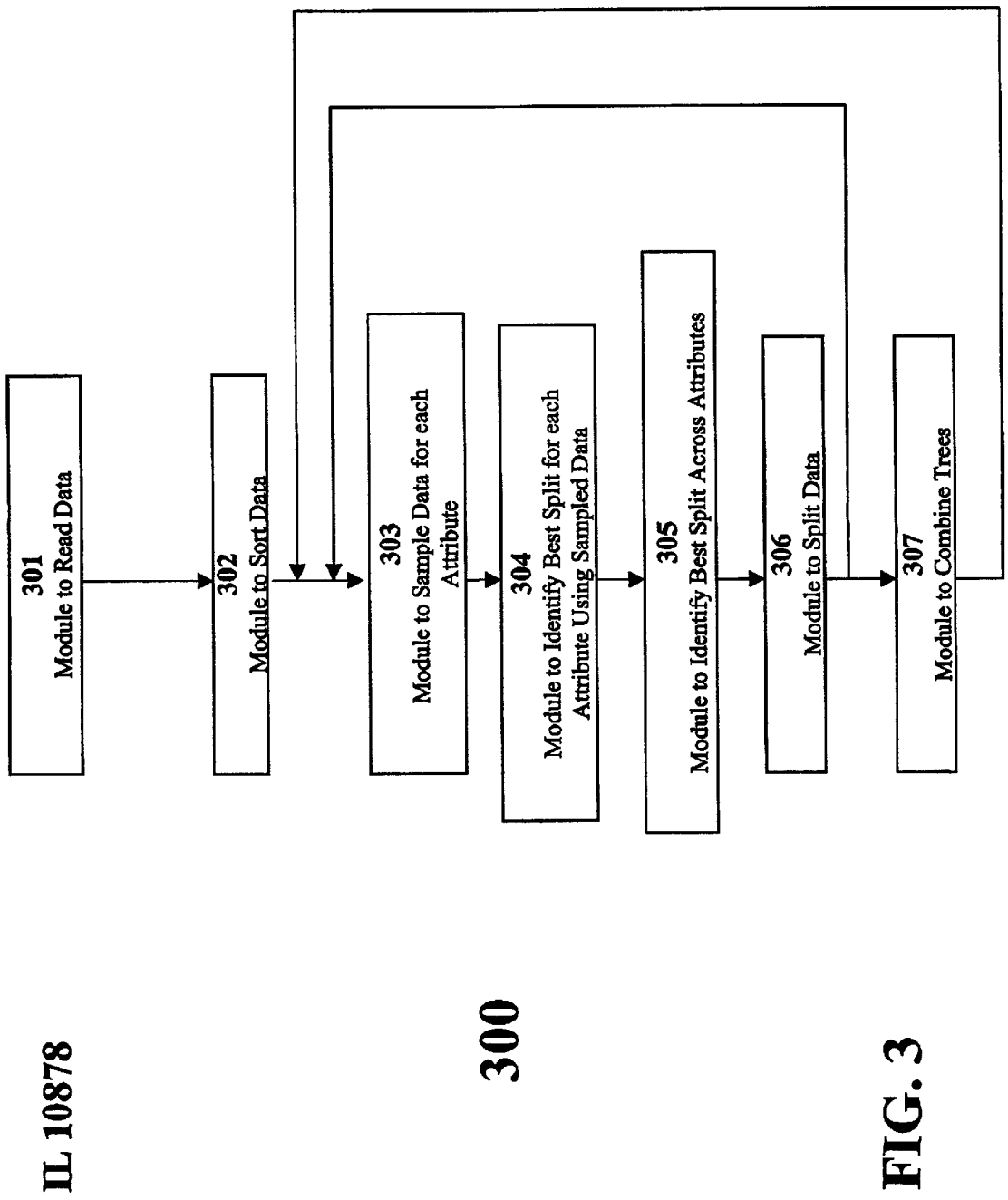
FIG. 3 is a flow chart illustrating modules included in another embodiment of a system incorporating the present invention.

Referring now to FIG. 3, a flow chart is provided illustrating various modules used in another embodiment of a system incorporating the present invention. The system is designated generally by the reference numeral 300. The following modules are included in flow chart: module to read data 301, module to sort the data 302, module to sample data for each attribute 303, module to identify the best split for each attribute using the sampled data 304, module to identify the best split across all attributes 305, module to split the data 306, and module to combine multiple decision trees 307. It is to be understood that not all of the modules are used in individual embodiments of the invention. The embodiment 300 can be implemented on parallel computers.

The first module 301 reads the data from a file to main memory. Once the data is read into memory, it is used to create several decision trees. The sorting for all the trees is done only once in module 302. Then, for each node of the decision tree, the data at the node is sampled in module 303, using a different sample for each attribute. There are several different ways in which the data can be sampled—the amount to be sampled can be specified as a fixed number or a percentage of the instances; the same sampling amount can be used for all nodes or the amount could vary; different techniques can be used to obtain the samples, etc. The sampled data at a node is used to identify the best split for each attribute in accordance with some splitting criterion in module 304. The best split across all attributes is identified in module 305. The data is then split in module 306. The modules of sampling the data for each attribute at a node, finding the best split for each attribute at a node, finding the best split across all attributes at a node, and splitting the data at a node is repeated for each unresolved node in the decision tree. The resulting decision trees are grouped by module 307 that combines multiple decision trees to create an ensemble.

Figure 4:
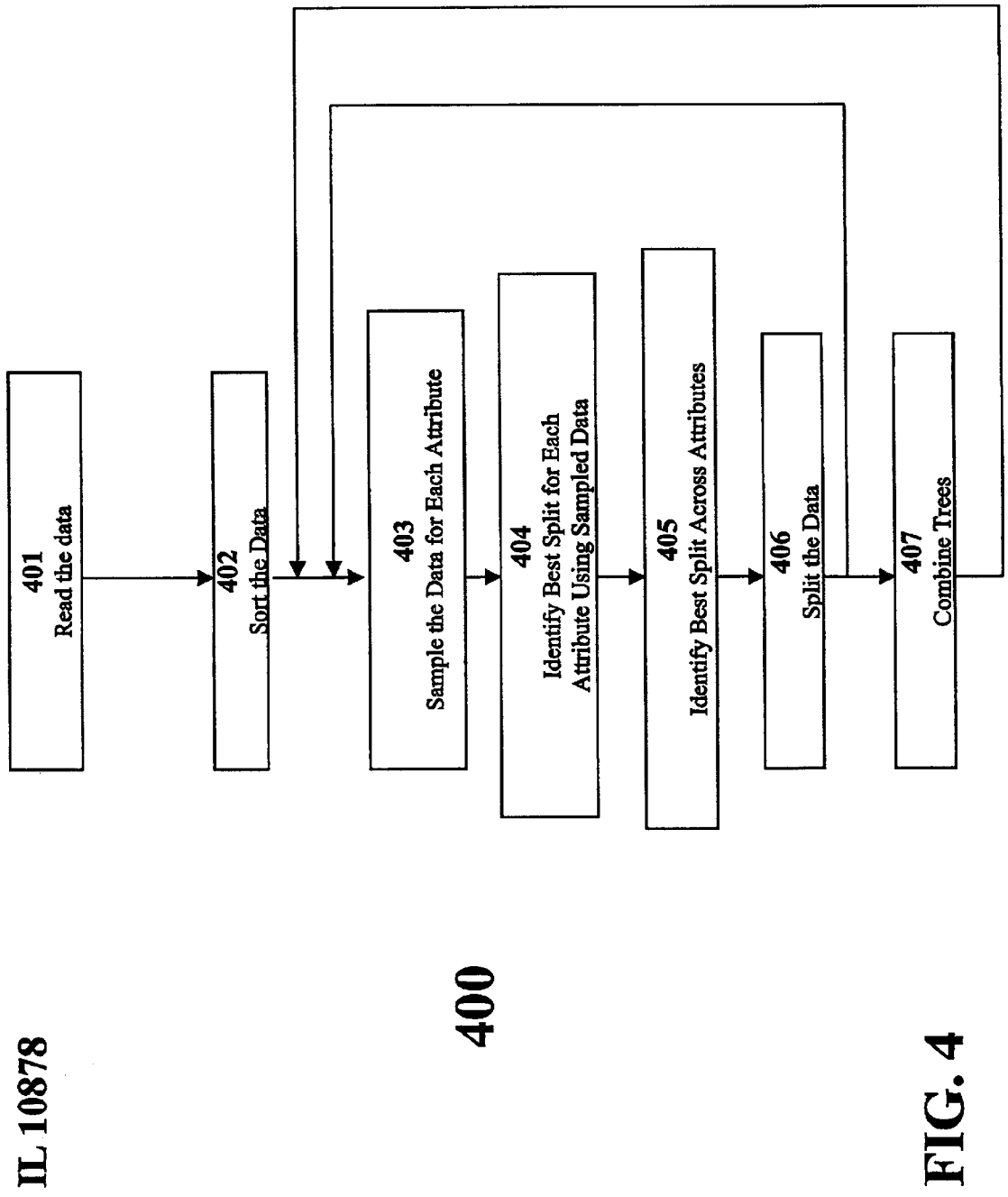
FIG. 4 is a flow chart illustrating the steps used in another embodiment of a system incorporating the present invention.

Referring now to FIG. 4, a flow chart is provided illustrating steps used in another embodiment of a system incorporating the present invention. The system is designated generally by the reference numeral 400. The following steps are included in the flow chart: step to read data 401, step to sort the data 402, step to sample data for each attribute 403, step to identify the best split for each attribute using the sampled data 404, step to identify the best split across all attributes 405, step to split the data 406, and step to combine multiple decision trees 407. It is to be understood that not all of the steps are used in individual embodiments of the invention. The embodiment 400 can be implemented on parallel computers.

The first step 401 reads the data from a file to main memory. Once the data is read into memory, it is used to create several decision trees. The sorting for all the trees is done only once in step 402. Then, for each node of the decision tree, the data at the node is sampled in step 403, using a different sample for each attribute. There are several different ways in which the data can be sampled—the amount to be sampled can be specified as a fixed number or a percentage of the instances; the same sampling amount can be used for all nodes or the amount could vary; different techniques can be used to obtain the samples, etc. The sampled data at a node is used to identify the best split for each attribute in accordance with some splitting criterion in step 404. The best split across all attributes is identified in step 405. The data is then split in step 406. The steps of sampling the data for each attribute at a node, finding the best split for each attribute at a node, finding the best split across all attributes at a node, and splitting the data at a node is repeated for each unresolved node in the decision tree. The resulting decision trees are grouped by step 407 that combines multiple decision trees to create an ensemble.

Experiments—To demonstrate the use of sampling at each node of a decision tree to create an ensemble, two sets of experiments were conducted. These used public-domain data sets from the University of California, Irvine (UCI) repository. Five data sets were used; three of them were small and two were relatively large. For the small data sets, no separate test data was available to evaluate the performance of the new algorithms. In these cases, 10 runs of 10-fold cross validation were used. This involved dividing the data into 10 equal parts, and averaging the results obtained by taking, in turn, each of the parts as a test set, using the remaining 9 parts as the training set. This process was repeated 10 times, and the average of these 10 runs was obtained.

TABLE 1

Description of the public-domain data sets used in the experiments

| Data set | # Training (Test) instances | # classes | # discrete attributes | # continuous attributes |
| --- | --- | --- | --- | --- |
| Breast cancer | 699 (—) | 2 | — | 9 |
| Pima diabetes | 768 (—) | 2 | — | 8 |
| German credit | 1000 (—) | 2 | 13 | 7 |
| Satellite image | 4435 (2000) | 6 | — | 36 |
| Letter recognition | 16000 (4000) | 26 | — | 16 |

For the first set of experiments, 10 decision trees were used in the ensemble, though this number can be varied. The results of the ensembles were combined using simple unweighted voting, though more complex voting schemes are possible. The trees created were not pruned, though several pruning options could have been used. When the number of sampled instances at a node of a decision tree was less than twice the number of attributes for an instance, the sampling was stopped and all instances were used to determine the split at the node. Any other test could also have been used to ensure that there was a sufficient number of instances at a node relative to the dimension, that is, the number of attributes, in the problem. A new sample of the instances was used for each attribute at a node; the same sample could have been used as well. Sampling was implemented by randomly selecting, with replacement, a fraction of the instances at a node. A fixed number of instances, instead of a fraction, could also have been used. The same sampling fraction was used at all applicable nodes in the decision tree, though this could have been varied. The splitting criterion used for evaluating the split at a node was the Gini criterion, though any other criterion could have also been used.

The test error rate, with standard error in parenthesis, for the five data sets as the fraction of instances sampled at a node is varied, is given in Table 2.

TABLE 2

Test error (standard error) on public-domain data sets as the fraction of the data sampled at a node is varied

| Fraction sampled | Breast cancer | Pima diabetes | German credit | Satellite image | Letter recognition |
| --- | --- | --- | --- | --- | --- |
| 0.9 | 3.41 | 25.17 | 28.47 | 11.76 | 11.71 |
|  | (.08) | (0.28) | (0.18) | (0.11) | (0.31) |
| 0.8 | 3.43 | 24.88 | 28.55 | 11.61 | 12.05 |
|  | (0.09) | (0.24) | (0.20) | (0.12) | (0.33) |
| 0.7 | 3.13 | 24.59 | 28.44 | 11.66 | 11.41 |
|  | (0.11) | (0.17) | (0.15) | (0.07) | (0.18) |
| 0.6 | 3.38 | 24.75 | 28.39 | 11.68 | 12.13 |
|  | (0.09) | (0.31) | (0.16) | (0.12) | (0.21) |
| 0.5 | 3.87 | 24.49 | 28.68 | 11.67 | 12.56 |
|  | (0.17) | (0.19) | (0.15) | (0.12) | (0.23) |
| 0.4 | 3.51 | 24.87 | 28.43 | 11.39 | 11.27 |
|  | (0.11) | (0.18) | (0.29) | (0.10) | (0.31) |
| 0.3 | 3.25 | 24.47 | 27.87 | 11.61 | 11.64 |
|  | (0.13) | (0.17) | (0.23) | (0.19) | (0.36) |
| 0.2 | 3.48 | 25.13 | 27.51 | 11.29 | 11.46 |
|  | (0.07) | (0.22) | (0.20) | (0.14) | (0.26) |
| 0.1 | 3.38 | 24.97 | 27.17 | 11.09 | 11.36 |
|  | (0.08) | (0.22) | (0.35) | (0.14) | (0.25) |
| 0.05 | 3.40 | 25.21 | 26.62 | 11.65 | 11.87 |
|  | (0.09) | (0.16) | (0.26) | (0.14) | (0.31) |
| 0.01 | 5.17 | 27.88 | 29.95 | 15.75 | 13.62 |
|  | (0.15) | (0.36) | (0.29) | (0.00) | (0.32) |

The test error rate for the competitive ensemble methods of bagging and boosting using the C4.5 software are given in Table 3. Also included are the results for a single tree without pruning and a tree created using the C4.5 software which includes pruning. The results in Table 3 that use the C4.5 software are obtained from the paper by Y. Freund and R. Schapire on "Experiments with a new boosting algorithm" that was published in the Thirteenth International Conference on Machine Learning, 1996.

TABLE 3

Test error rates on public-domain data sets for competitive methods

| Data set | Single tree, without pruning | C4.5, single tree with pruning | Boosting using C4.5 | Bagging, using C4.5 |
| --- | --- | --- | --- | --- |
| Breast cancer | 5.17 | 5.00 | 3.3 | 3.2 |
| Pima diabetes | 27.88 | 28.4 | 25.7 | 24.4 |
| German credit | 29.95 | 29.4 | 25.0 | 24.6 |
| Satellite image | 15.75 | 14.8 | 8.9 | 10.6 |
| Letter recognition | 30.62 | 13.8 | 3.3 | 6.8 |

The results from Table 2 show that, for the method proposed by the Applicants, the test error remains roughly constant for all the data sets as the fraction sampled is varied. Further, the error rate for the ensembles of ten unpruned trees in Table 2 is smaller than the error rate for a single unpruned tree in Table 3 as well as a single pruned tree created using the C4.5 software. This shows that the new method proposed can improve the accuracy of the decision tree classifier. As the fraction of the instances used is reduced to a very small number (e.g., 1% of the instances at a node), the error rate often reverts back to the original rate for a single tree. This is because the condition that the number of sampled instances be greater than twice the number of attributes is violated at the root node of the decision tree, and therefore, no sampling is done at any node. As a result, each tree in the ensemble is the same as a single tree, and no improvement in accuracy is obtained. This, combined with the fact that accuracy remains constant with a change in fraction sampled, indicates that the fraction sampled can be reduced to a low enough level so that the number of sampled instances at the root of the decision tree is just greater than twice the number of attributes.

The new techniques are also competitive in accuracy with other ensemble approaches such as bagging and boosting. Any differences in accuracy can be explained by the fact that the new techniques use unpruned trees and the Gini criterion for splitting, while the competitive techniques with the C4.5 code use pruned trees and the information gain criterion for splitting.

By working with a sample of the instances at a node, fewer split points have to be evaluated and thus less work is done at each node. The tree can thus be created in a shorter time. The second set of experiments was done to evaluate how much faster the Applicants' techniques would be relative to the creation of a single tree and other ensemble-based decision tree classifiers. Table 4 gives the results for the time taken to create a single tree (without any sampling), as well as an ensemble of 10 trees using the new algorithm. These timings were obtained on a 800 MHz Pentium III system with 512 MB of memory. The sampling fraction was set equal to 0.1, that is 10 percent of the instances at each node of the tree were used in evaluating the split at that node. Only the larger two data sets were considered in this experiment. No pruning was used, either for the single tree or for the trees in the ensemble.

TABLE 4

Timing results in seconds for 10 runs of a single tree and 10 runs of an ensemble of 10 trees using the new algorithm

|  | Satellite image | Letter recognition |
|---|---|---|
| Single tree | 63 | 263 |
| Ensemble (1) | 488 | 1279 |
| Ensemble (2) | 434 | 1222 |
| Ensemble (3) | 51 | 123 |

Three different implementations of the new technique were considered. The first approach (referred to as Ensemble (1)) in Table 4, was implemented using an efficient approach to sampling. At each node of the decision tree, the instances have to be sorted for each attribute. It is well known that efficient coding can be used to preserve the sorted order of the instances once the sort has been done at the root node of the tree. However, the random sampling of the instances proposed in the new algorithm can destroy this sorted order. To preserve this order, the Ensemble (1) technique first divides the sorted instances into ten equal parts (corresponding to the 10 percent sampling) and then picks an instance randomly from each part. This preserves the sorted order and only one sort has to be done at the beginning for each decision tree. The implementation in Ensemble (2) exploits the fact that each tree in the ensemble uses the same original set of instances. Therefore, the first time-consuming sort that is done on all instances, can be done only once across all the trees in the ensemble. This is in contrast with other ensemble-based approaches such as bagging and boosting, where a different set of instances is used at the root node of each tree in the ensemble. However, the same technique of sorting the initial instances only once across all trees in the ensemble can be applied in these competitive techniques by appropriately weighting the instances used in each tree (with a weight of zero for instances not selected). The implementation in Ensemble (3) combines the two approaches in Ensemble (1) and Ensemble (2).

The results in Table 4 indicate that efficient implementations of the new technique can be very effective. Instead of an ensemble of N trees taking N times as long to create, the use of sampling and the single sort across all trees can reduce the time substantially. In fact, it can even reduce the time to less than the time taken to create a single tree, while resulting in more accurate trees due to the effect of the ensembles.

This algorithm, and its variants, can be applied wherever classification algorithms such as decision trees are used in data mining. The algorithm, and its software implementation, can be used in many commercial areas, wherever there is need to improve the accuracy of classification with little added overhead. The data being analyzed using the classification algorithms can be either scientific or commercial. For example an insurance company can use it to decide if a person is a good risk, an astronomer can use it to classify an object as a star or galaxy, and a telephone company can use it to decide if a person is likely to change to a different vendor. It can also be used for targeting marketing, identifying bad widgets in an assembly line during quality control, and in various medical applications such as identification of cancerous cells in a mammogram, or identifying the best treatment for a patient.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A decision tree system, comprising:
   a module to read the data and use the data to create multiple decision trees having nodes,
   a module to sort the data,
   a module to evaluate a potential split of the data according to some criterion, using a random sample of the data at said nodes,
   a module to split the data, and
   a module to combine said multiple decision trees in ensembles.

2. The decision tree system of claim 1 including a file and a main memory, wherein said module to read the data reads the data from said file to said main memory.

3. The decision tree system of claim 1 wherein the said module to sort the data, sorts it N times for each of the N trees in the ensemble.

4. The decision tree system of claim 1 wherein the said module to sort the data, sorts it once for the N trees in the ensemble.

5. The decision tree system of claim 1 wherein said module to evaluate a potential split of the data according to some criterion using a random sample of the data, with said criterion including attributes, uses a different sample for each attribute.

6. The decision tree system of claim 5 wherein said random sample of the data uses instances of the data and said sample is a fixed number of the instances.

7. The decision tree system of claim 5 wherein said random sample of the data uses instances of the data and said sample is a percentage of the instances.

8. The decision tree system of claim 1 wherein said module to evaluate a potential split of the data according to some criterion using a random sample of the data, with said criterion including attributes, uses the same sample for each attribute.

9. The decision tree system of claim 8 wherein said random sample of the data uses instances of the data and said sample is a fixed number of the instances.

10. The decision tree system of claim 8 wherein said random sample of the data uses instances of the data and said sample is a percentage of the instances.

11. The decision tree system of claim 1, wherein the said criterion to evaluate a potential split of the data is the information gain criterion.

12. The decision tree system of claim 1, wherein the said criterion to evaluate a potential split of the data is the gain criterion.

13. The decision tree system of claim 1, wherein the said criterion to evaluate a potential split of the data is the information gain ratio criterion.

14. The decision tree system of claim 1, wherein the said criterion to evaluate a potential split of the data is the Twoing rule.

15. The decision tree system of claim 1, wherein the said module to combine multiple trees in ensembles uses plurality (that is majority) voting.

16. The decision tree system of claim 1, wherein the said module to combine multiple trees in ensembles uses weighted voting, where different weights are given to the output from each tree.

17. A decision tree system, comprising the:
means to read the data and use the data to create multiple decision trees having nodes,
means to sort the data,
means to evaluate a potential split of the data according to some criterion, using a random sample of the data at said nodes,
means to split the data, and the
means to combine said multiple decision trees in ensembles.

18. The decision tree system of claim 17 including a file and a main memory and wherein said means to read the data reads the data from said file to said main memory.

19. The decision tree system of claim 17 wherein the said means to sort the data, sorts it N times for each of the N trees in the ensemble.

20. The decision tree system of claim 17 wherein the said means to sort the data, sorts it once for the N trees in the ensemble.

21. The decision tree system of claim 17 wherein the said means to evaluate a potential split of the data according to some criterion using a random sample of the data, with said criterion including attributes, uses a different sample for each attribute.

22. The decision tree system of claim 21 wherein said random sample of the data uses instances of the data and said sample is a fixed number of the instances.

23. The decision tree system of claim 21 wherein said random sample of the data uses instances of the data and said sample is a percentage of the instances.

24. The decision tree system of claim 17 wherein the said means to evaluate a potential split of the data according to some criterion using a random sample of the data, with said criterion including attributes, uses the same sample for each attribute.

25. The decision tree system of claim 24 wherein said random sample of the data uses instances of the data and said sample is a fixed number of the instances.

26. The decision tree system of claim 24 wherein said random sample of the data uses instances of the data and said sample is a percentage of the instances.

27. The decision tree system of claim 17, wherein the said means to evaluate a potential split of the data is the information gain criterion.

28. The decision tree system of claim 17, wherein the said means to evaluate a potential split of the data is the gini criterion.

29. The decision tree system of claim 17, wherein the said means to evaluate a potential split of the data is the information gain ratio criterion.

30. The decision tree system of claim 17, wherein the said means to evaluate a potential split of the data is the Twoing rule.

31. The decision tree system of claim 17, wherein the said means for combining multiple trees in ensembles uses plurality (that is, majority) voting.

32. The decision tree system of claim 17, wherein the said means for combining multiple trees in ensembles uses weighted voting, where different weights are given to the output from each tree.

33. A decision tree method, comprising the steps of:
reading the data and using the data to create multiple decision trees having nodes,
sorting the data,
evaluating a potential split of the data according to some criterion, using a random sample of the data at said nodes,
splitting the data, and
combining said multiple decision trees in ensembles.

34. The decision tree method of claim 33 including a file and a main memory and wherein the said step to read the data, reads the data from said file to said main memory.

35. The decision tree method of claim 33 wherein the said step to sort the data, sorts it N times for each of the N trees in the ensemble.

36. The decision tree method of claim 33 wherein the said step to sort the data, sorts it once for the N trees in the ensemble.

37. The decision tree method of claim 33 wherein the said step to evaluate a potential split of the data according to some criterion using a random sample of the data, with said criterion including attributes, uses a different sample for each attribute.

38. The decision tree method of claim 37 wherein said random sample of the data uses instances of the data and the said sample is a fixed number of the instances.

39. The decision tree method of claim 37 wherein said random sample of the data uses instances of the data and said sample is a percentage of the instances.

40. The decision tree method of claim 33 wherein the said step to evaluate a potential split of the data according to some criterion using a random sample of the data, with said criterion including attributes, uses the same sample for each attribute.

41. The decision tree method of claim 40 wherein said random sample of the data uses instances of the data and the said sample is a fixed number of the instances.

42. The decision tree method of claim 40 wherein said random sample of the data uses instances of the data and said sample is a percentage of the instances.

43. The decision tree method of claim 33, wherein the said step to evaluate a potential split of the data uses the information gain criterion.

44. The decision tree method of claim 33, wherein the said step to evaluate a potential split of the data uses the gini criterion.

45. The decision tree method of claim 33, wherein the said step to evaluate a potential split of the data uses the information gain ratio criterion.

46. The decision tree method of claim 33, wherein the said step to evaluate a potential split of the data uses the Twoing rule.

47. The decision tree method of claim 33, wherein the said step to combine multiple trees in ensembles uses plurality (that is majority) voting.

48. The decision tree method of claim 33, wherein the said step to combine multiple trees in ensembles uses weighted voting, where different weights are given to the output from each tree.

* * * * *